US012753104B2

(12) United States Patent
Albertí Gascons

(10) Patent No.: US 12,753,104 B2
(45) Date of Patent: Oct. 6, 2026

(54) METHOD OF MANUFACTURING A SET OF MASS-PRODUCED GLASS CONTAINERS, RAW MATERIAL COMPOSITION, AND SET OF RESULTING MASS-PRODUCED GLASS CONTAINERS

(71) Applicant: Estal Packaging, S.A., Sant Feliu de Guíxols (ES)

(72) Inventor: Gerard Albertí Gascons, Sant Feliu de Guíxols (ES)

( * ) Notice: Subject to any disclaimer, the term of this patent is extended or adjusted under 35 U.S.C. 154(b) by 140 days.

(21) Appl. No.: 18/283,723

(22) PCT Filed: Mar. 23, 2022

(86) PCT No.: PCT/ES2022/070168
§ 371 (c)(1),
(2) Date: Sep. 22, 2023

(87) PCT Pub. No.: WO2022/200661
PCT Pub. Date: Sep. 29, 2022

(65) Prior Publication Data
US 2024/0150212 A1 May 9, 2024

(30) Foreign Application Priority Data
Mar. 25, 2021 (ES) ............................ ES202130604U

(51) Int. Cl.
*C03B 5/00* (2006.01)
*C03B 9/193* (2006.01)

(52) U.S. Cl.
CPC .............. *C03B 5/005* (2013.01); *C03B 9/193* (2013.01)

(58) Field of Classification Search
CPC ................................ C03C 1/002; C03B 5/005
See application file for complete search history.

(56) References Cited

U.S. PATENT DOCUMENTS 1,828,217 A * 10/1931 Barker, Jr. ................ C03B 7/08 65/121
2,979,865 A * 4/1961 Rough .................... C03B 5/173 501/72

(Continued)

FOREIGN PATENT DOCUMENTS

CN 101555093 A * 10/2009 ............. C03B 5/173
CN 111777328 A * 10/2020 ............. C03B 9/347

(Continued)

*Primary Examiner* — Erin Snelting
*Assistant Examiner* — Steven S Lee
(74) *Attorney, Agent, or Firm* — Eugenio J. Torres-Oyola; Victor M. Rodriguez-Reyes; Rafael Rodriguez-Muriel

(57) ABSTRACT

The invention relates to a method of manufacturing a set of mass-produced glass containers, a raw material composition, and a set of resulting mass-produced glass containers, wherein the method comprises obtaining successive batches of raw material including, in a certain percentage of at least 80% by weight, a mixture of, for the most part, clear pieces of recovered post-consumer glass and with a heterogeneous and variable chromatic composition in successive batches, melting the successive batches of raw material, and automatically manufacturing the set of clear mass-produced containers with an identical shape, automatically detecting and rejecting the manufactured containers exhibiting dimensional and/or safety defects causing alterations in the shape and/or geometry of the container above predefined tolerances, ignoring the chromatic and/or aesthetic manufacturing defects, and filling all the containers from the set of non-rejected mass-produced containers with the same content and labeling with an identical label.

8 Claims, 1 Drawing Sheet

(56) References Cited

U.S. PATENT DOCUMENTS

| | | | | | |
|---|---|---|---|---|---|
| 4,367,086 | A * | 1/1983 | Sarpaneva | C03B 19/02<br>D7/509 |
| 5,354,984 | A * | 10/1994 | Baldwin | G01B 11/024<br>382/142 |
| 8,436,268 | B1 * | 5/2013 | Afsari | B07C 5/366<br>209/580 |
| 10,710,918 | B1 * | 7/2020 | Cooper | C03B 11/10 |
| 2004/0078110 | A1 * | 4/2004 | Lehman | C03C 4/02<br>700/157 |
| 2006/0101856 | A1 * | 5/2006 | Lehman | C03B 1/00<br>65/134.8 |
| 2007/0095017 | A1 * | 5/2007 | Menke | B65C 9/067<br>53/167 |
| 2015/0147497 | A1 * | 5/2015 | Brouwer | C03C 3/04<br>65/83 |
| 2017/0015582 | A1 * | 1/2017 | Brouwer | C03C 3/087 |
| 2020/0071221 | A1 | 3/2020 | Willis et al. | |

FOREIGN PATENT DOCUMENTS

| | | | | | |
|---|---|---|---|---|---|
| CZ | 116 | U1 | | 2/1993 | |
| DE | 69107012 | T2 | | 8/1995 | |
| DE | 19508536 | A1 | * | 1/1996 | C03B 17/025 |
| EP | 0482972 | A1 | * | 4/1992 | C03B 7/16 |
| JP | 2002053323 | A | * | 2/2002 | C03C 1/002 |
| JP | 2002346505 | A | * | 12/2002 | B09B 3/00 |
| RU | 2627519 | C1 | * | 8/2017 | C03B 3/02 |
| WO | WO-9805599 | A1 | * | 2/1998 | C03B 5/173 |

* cited by examiner

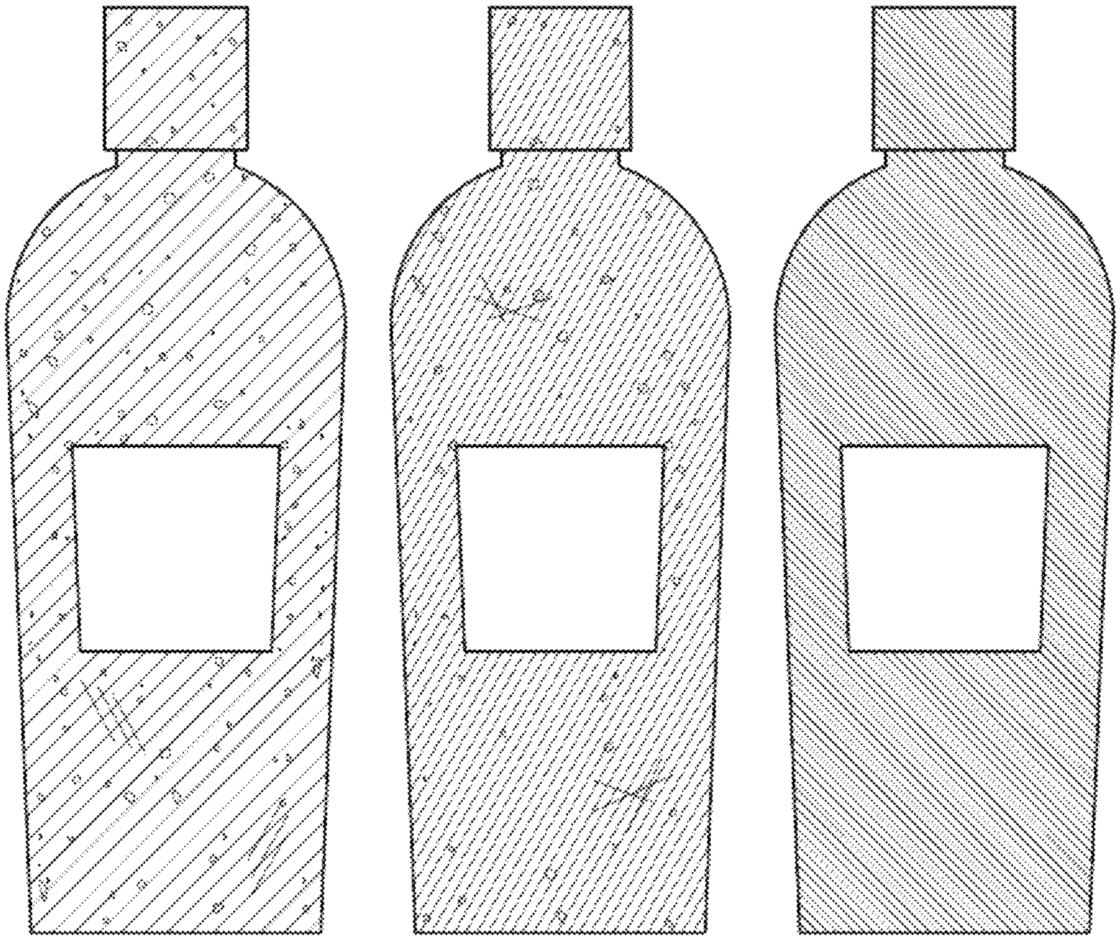

METHOD OF MANUFACTURING A SET OF MASS-PRODUCED GLASS CONTAINERS, RAW MATERIAL COMPOSITION, AND SET OF RESULTING MASS-PRODUCED GLASS CONTAINERS

TECHNICAL FIELD

The present invention relates to a method of manufacturing a set of mass-produced, i.e., uniformly produced, glass containers all with identical shape, identical content, and identical labeling, and to the set of mass-produced glass containers resulting from said method. The containers will be clear and colored containers, wherein different containers among said containers have a noticeable difference in color and/or in color intensity, obtained by the use of a high percentage of recovered post-consumer glass, having an unpredictable composition, as a raw material for the manufacture thereof.

STATE OF THE ART

It is common to use a certain percentage of recycled glass to produce new containers in the glass industry, because it is easy to recycle glass and it allows energy, and therefore cost savings, compared with obtaining glass directly from virgin raw material.

In the process of manufacturing containers, a certain percentage of containers produced are discarded because they exhibit technical manufacturing defects which prevent them from working properly, for example preventing them from being properly capped. There is also a certain percentage of discarded containers because these containers exhibit aesthetic manufacturing defects, such as bubbles, scratches, corrugations, etc., which while they do not alter their functionality they do alter their appearance.

All these discarded containers can be recycled in the same factory, putting them back into the glass furnace, without altering the color of the glass batch being manufactured, since all the containers recycled this way have all identical color and shade. This type of recycled glass is known as pre-consumer glass.

The use of recycled post-consumer glass, i.e., glass that has already been used by consumers and has been recovered, typically by means of selective collection processes, is also known. This recycled post-consumer glass is a heterogeneous glass, having a mixture of different transparencies, of different shades of color, and also of different color saturations, so it is typically only used in small proportions to prevent the use from noticeably affecting the color of the containers to be manufactured.

Said recycled post-consumer glass is usually separated by transparency ranges, whether by means of automatic selection devices or by means of a manual sorting process, for example by the user recycling it, separating the clear colorless or colored glasses from the opaque colored glasses, for example brown or green glasses, typically used in the beer and wine industries. Typically, said opaque colored glasses are considered to be those that let less than 75%, and preferably less than 60%, of the incident visible light pass therethrough.

These selection systems are flawed, so even the selected recovered post-consumer glass has a heterogeneous mixture of clear colorless glass, clear colored glass, and opaque colored glass.

In some cases, the glass can also be separated by colors, distinguishing green glass, brown glass, or even blue glass.

However, these methods do not allow the separation of glasses of different shades of the same color, for example different colors of clear glass or different colors of opaque glass.

Therefore, recycled post-consumer glass, even when selected by transparencies, has a heterogeneous coloring.

Furthermore, due to the heterogeneous origin of the recycled post-consumer glass, that mixture of different colors varies with each lot, therefore being somewhat unpredictable, so recovered post-consumer glass is normally used in low percentages to prevent unpredictable variations of the shade of the resulting containers.

Therefore, the incorporation of recycled post-consumer glass in high percentages, greater than 80% or even greater than 90%, is not used for the manufacture of containers for retail use, particularly for the manufacture of clear containers, because the exact shade of the resulting color is unpredictable, particularly for the manufacture of clear colored glass containers.

BRIEF DESCRIPTION OF THE INVENTION

According to a first aspect, the present invention relates to a method of manufacturing a set of mass-produced glass containers.

The proposed method comprises, in a known manner, the following steps:

- obtaining successive batches of raw material for glass manufacture, with each batch including, in a certain percentage, a mixture of, for the most part, clear pieces of recovered glass;
- melting the successive batches of raw material;
- automatically manufacturing, from successive batches of molten raw material, a set of clear mass-produced containers with an identical shape by means of an automatic compression and/or blow molding process;
- automatically detecting and rejecting the manufactured containers exhibiting manufacturing defects above predefined tolerances;
- filling all the containers from the set of non-rejected mass-produced containers with the same content and labeling with an identical label.

Based on the above, mass-produced glass containers are known to be manufactured by means of melting successive batches of raw material and by means of an automatic compression and/or blow molding process.

The raw material usually comprises mainly silicon dioxide, sodium carbonate, and calcium carbonate in different proportions, whether in the form of minerals or sands, or contained in pieces of recovered glass with said components in its composition. Therefore, a certain proportion of pieces of recovered glass previously manufactured with glass with the same composition as the glass to be obtained is also known to be incorporated as part of the raw material.

Other additives and compounds added to the raw material will allow clear glass with different shades to be obtained.

A clear glass is understood to mean one that lets more than 75% of the incident visible light, or preferably more than 85% of the incident visible light pass therethrough, glasses with a transparency below this threshold being considered opaque glasses.

The incorporation of a high percentage of pieces of non-colorless recovered glass in raw material will cause a noticeable alteration of the color of the manufactured containers, because said non-colorless recovered glass will incorporate color additives and compounds in the raw material in a proportion that is sufficient to cause a visible effect in the resulting containers.

The automatic mass production of glass bottles typically comprises a first compression molding of the opening of the container in a compression mold, generating a parison, and then the insertion of the parison into a blow mold where the parison expands by blowing inside the molding cavity of said blow mold, defining the shape and the size of the bottle against the inner surface of the mold.

The mold will typically be formed by at least two complementary halves that can be opened to facilitate removing the bottle therefrom.

The automatic detection of bottles with manufacturing defects usually involves the use of optical detectors, such as cameras and/or laser meters, as well as a control device which executes an algorithm that analyzes the data obtained by the optical detectors to detect the manufacturing defects which exceed the predefined tolerances stored in the control device.

This can be achieved, for example, by comparing the images obtained by the cameras with reference images stored in the control device.

Those bottles exhibiting dimensional defects above predefined tolerance thresholds are rejected. The defects may affect the bottle as a whole or parts thereof. For example, in the opening, tolerances are usually much smaller since the correct closure of the bottle is essential and largely depends on the dimensional and shape precision of its opening, so the automatic detection of dimensional manufacturing defects is usually concentrated in said area of the opening.

The present invention furthermore proposes, in a manner that is not known:

- the mixture of pieces of recovered glass is post-consumer glass with a heterogeneous and variable chromatic composition in successive batches and constituting at least 80% by weight of the batches of raw material, such that different manufactured containers from the set of mass-produced containers have a different visible light absorption pattern, being clear containers with a noticeably different color and/or color intensity; and in that
- only those dimensional and/or safety manufacturing defects causing alterations in the shape and/or geometry of the container are automatically detected and rejected, ignoring the chromatic and/or aesthetic manufacturing defects.

The use of recovered post-consumer glass, i.e., glass that has reached the retail market, usually in the form of bottles, and has been recovered through a recovery system for recycling, has the drawback of being from an uncertain source and of involving a heterogeneous mixture of colors and therefore of compositions.

Typically, the pieces of recovered post-consumer glass used as raw material in the production of clear containers have been kept in discrete percentages, usually less than 15%, for the purpose of limiting chromatic contamination of the containers to be manufactured with the colors of the recovered post-consumer glass.

Higher percentages of recovered post-consumer glass are only used in the manufacture of opaque containers, with a transparency less than 75%, and containers with a dark coloring, typically brown, that is much more resistant to chromatic contamination. However, to keep the coloring of the containers, even opaque containers with a dark coloring stable, it is necessary to maintain certain stability and uniformity in the raw material, which cannot be achieved with percentages of at least 80% of recovered post-consumer glass.

According to the present method, the raw material will contain at least 80% by weight of clear pieces of recovered post-consumer glass having a heterogeneous and variable chromatic composition over time, so the different successive batches of raw material will have a different chromatic composition.

Since the pieces of recovered glass are clear, and since they constitute the majority of the raw material (at least 80%), the resulting containers will be clear, but non-colorless due to chromatic contamination. Different containers manufactured with different batches of raw material will have a different coloring with respect to one another.

This allows increasing the utilization of recovered post-consumer glass, while at the same time a visual indication is provided to the consumer about the manufacture with high percentages of recovered post-consumer glass, which is clearly identifiable by the chromatic variation between identical containers with an identical content and labeling but with a different color.

According to one embodiment, the mixture of pieces of recovered glass may constitute at least 90% or 95% by weight of the batches of raw material.

Preferably, the different batches of raw material will lack color additives other than those contained in the pieces of recovered glass constituting the raw material, so the resulting color will depend entirely on the colors of the mixture of pieces of recovered post-consumer glass used as raw material.

The mixture of chromatically heterogeneous pieces of post-consumer glass will preferably comprise a mixture of pieces of clear colorless glass in a first percentage, and of pieces of clear colored glass in a second percentage and/or of pieces of opaque colored glass in a third percentage, with the first percentage and the second and/or third percentages being variable between different batches of raw material, with maximum variations of at least 10% or of at least 15% between different batches.

In other words, between a batch with the minimum first percentage and a batch with the maximum first percentage there will be a difference of at least 10% or of at least 15%.

- clear glass is understood to be one that lets more than 75% of the incident visible light pass therethrough, and opaque glass is understood to be one that lets equal to or less than 75% of the incident visible light pass therethrough.

In the clear glass, the specular transmission of visible light therethrough predominates over the diffuse transmission and over the reflection of visible light.

In the colored glass, the absorption of the visible light traversing the container is non-homogeneous in different visible light frequency ranges, following a visible light absorption pattern, therefore being colored containers, as they absorb more certain light frequencies corresponding to certain colors, modifying the color of the light that passes therethrough.

The pieces of colored glass used as part of the raw material may constitute at least 20% of the total weight of the mixture of pieces of recovered glass.

The pieces of colored glass may comprise pieces of clear colored glass, which lets more than 75% of the incident visible light pass therethrough, and/or of pieces of opaque colored glass, which lets less than 75% of the incident visible light pass therethrough.

The pieces of colored glass may comprise pieces of green, brown, and optionally blue glass, in variable proportions in successive batches.

The temperature of the molten material and/or of the molds may be selected to generate visible flaws in the manufactured containers, using sub-optimal values. Optionally, the raw material may also contain bubble precursor particles which, when melted and solidified, generate small gas bubbles inside the glass.

Said visible flaws, such as bubbles or corrugations, for example, provide greater identifiability of the container, as a container obtained from recovered post-consumer glass.

According to a second aspect, the present invention relates to a raw material composition for the manufacture of a set of mass-produced clear glass containers, all with an identical shape, content, and labeling, wherein the composition comprises successive batches of raw material, each batch of raw material including, in a certain percentage, a mixture of, for the most part, clear pieces of recovered glass.

The proposed composition furthermore contemplates, in a manner that is not known, the mixture of pieces of recovered glass being post-consumer glass with a heterogeneous and variable chromatic composition in successive batches and constituting at least 80% by weight of the batches of raw material, such that different manufactured containers from the set of mass-produced containers have a different visible light absorption pattern, being clear containers with a noticeably different color and/or color intensity.

According to a third aspect, the present invention relates to a set of mass-produced glass containers obtained by the method described above, i.e., mass-produced containers, all with an identical shape, content, and labeling, typically a series of containers with identical geometry for the retail sale of the same product.

In each of said mass-produced containers from the set, the specular transmission of visible light through the container predominates over the diffuse transmission and over the reflection of visible light, therefore being clear containers, and the absorption of the visible light traversing the container is non-homogeneous in different visible light frequency ranges, following a visible light absorption pattern, therefore being transparent colored containers, as they absorb more certain light frequencies corresponding to certain colors, modifying the color of the light that passes therethrough.

When the radiation emitted by a light source falls on an object, various optical phenomena occur, such as reflection, refraction, absorption, scattering, or transmission. These optical phenomena occur on the surface where the radiation falls, inside the product itself and through its entire thickness.

Generally, the incident light beam falling on the surface of an object is reflected at a certain intensity in a specular or diffuse manner, depending on the surface roughness, and experiences a phenomenon of being refracted into the material. Depending on the absorbent compounds present in the media, internal absorption and/or dispersion phenomena take place within the material. In materials with sufficient refractive index homogeneity, the transmission of a certain light intensity through the entire thickness of the product in a regular or diffuse manner also takes place.

Based on the predominant optical phenomenon, objects may be classified as transparent objects, where specular transmission predominates, opaque objects, where reflection predominates, and translucent objects, where diffuse transmission predominates.

In transparent objects, color is defined through the transmission spectrum of the object, i.e., if there is a non-homogeneous absorption of the light traversing the object, with more absorption occurring at certain visible light frequencies than at other frequencies, there will be an alteration of the color of the visible light traversing the object, causing a coloring of said object.

The present invention proposes, in a manner that is not known in the state of the art, different containers from the set of mass-produced containers having a different visible light absorption pattern, causing a noticeable difference in color and/or a noticeable difference in color intensity.

In other words, different containers from the set of mass-produced containers, with an identical shape, content, and labeling, will have a different color to the naked eye, therefore exhibiting a chromatic variability within the set.

This chromatic variability allows the different containers from the set of mass-produced containers to be manufactured using heterogeneous recovered post-consumer glass in a certain percentage greater than 80% or greater than 90%, said post-consumer glass including clear pieces of glass with varied coloring, mixing pieces of colorless glass with pieces of green, brown, and/or blue glass in different percentages.

Given its nature, recovered post-consumer glass has a chromatic composition that is non-homogeneous, non-constant over time, and unpredictable, so its use in high percentages, greater than 80% or preferably greater than 90% or even 95% or more, produces a chromatic heterogeneity noticeable to the naked eye in the produced mass-produced containers over time.

The present invention may also comprise a method of manufacturing a set of bottles, which includes obtaining a selection of clear and heterogeneous pieces of post-consumer glass, which includes a mixture of pieces of glass with noticeably different colors.

Said post-consumer glass will be used as raw material for the manufacture of the set of containers described above, constituting at least 80% by weight of the raw material, or preferably at least 90% by weight of the raw material.

Other features of the invention will become apparent in the following detailed description of an embodiment.

DESCRIPTION OF THE FIGURES

FIG. 1 shows a schematic elevational view of three containers, in the form of bottles, constituting the set of mass-produced containers, the three containers having an identical shape, size, content, and labeling but differing in color, depicted by means of a different hatching, and also differing in that they include different noticeable aesthetic defects. In this example, the container on the left includes a number of bubbles and some scratches, the container in the middle includes fewer bubbles and other different scratches, and the container on the right does not include any bubbles or scratches.

DETAILED DESCRIPTION OF AN EMBODIMENT

The embodiments described below are non-limiting illustrations of the present invention.

The containers from the proposed set of mass-produced glass containers all have an identical shape, content, and labeling.

Each of said mass-produced containers from the set is a clear colored container.

clear containers are those in which the specular transmission of visible light therethrough predominates over other phenomena such as the diffuse transmission and the reflection of visible light.

Preferably, clear containers are those which let at least 60%, or preferably at least 75% of the visible light pass therethrough.

Said clear containers will furthermore be colored containers when the absorption of the visible light traversing the container is not homogeneous in different visible light frequency ranges, following a visible light absorption pattern. For example, if the glass constituting the container absorbs predominantly those wavelengths corresponding to the color blue, the white light traversing said container will have a yellowish color, because red and green light will predominate, and their mixture will produce a yellowish color.

Different containers from the set of mass-produced containers have a different visible light absorption pattern causing a noticeable difference in color and/or a noticeable difference in color intensity. In other words, the set of containers has at least two containers with an identical shape, content, and labeling but with a different color of glass, for example one container being a green color and another container being a turquoise color.

Preferably, the noticeable difference in color between different containers from the set of mass-produced containers is also understood to be determined by a difference of at least 16 nm, or preferably of at least 20 nm or 25 nm, in the predominant color of a visible white light after passing therethrough.

By way of example, it is provided that between a clearly blue color, defined between 450 nm and 470 nm, and a clearly green color, defined between 510 nm and 530 nm, there are at least two intermediate colors.

The visible light spectrum consists of 400 nm, from 380 nm to 780 nm, so a difference of 16 nm represents a division of the entire visible spectrum into twenty-six chromatic subdivisions, which are sufficiently different from one another to be distinguished by a user with the naked eye.

This means that it is possible to define, for example, seven main colors corresponding to red (from 780 nm and to around 668 nm), orange (around 620 nm), yellow (around 572 nm), green (around 524 nm), turquoise (around 476 nm), blue (around 444 nm), and violet (from 380 to around 396 nm). This classification allows two additional colors to be intercalated between each of these seven main colors, with jumps of 16 nm.

The predominant colors in the clear glass bottles are the colors comprised between green and blue, although there are also reddish and brown colors.

The color brown is typically defined as a mixture of red light with a small amount of green light, and also optionally with very little blue. The color red is defined as a color with a dominant wavelength measuring between 780 nm and about 630 nm.

Therefore, the pieces of glass of a selected color are those the color of which is within the aforementioned range or, in the case of brown, contains a mixture of colors within the mentioned ranges.

Therefore, between the color green and the color blue there will be other noticeably different colors with jumps of at least 16 nm between them. In this example, there will be at least one green defined around 508 nm, and one green defined around 492 nm (emerald and aquamarine) between green and turquoise, and there will be at least one blue of 460 nm (cerulean) between turquoise and blue. According to the present invention, the set will include at least two containers the color of which exhibits a difference of at least 16 nm, or preferably 20 nm or 25 nm, the color of these containers being in several of said chromatic subdivisions.

In addition to being defined by wavelength, the color can also be defined by the intensity of said color. A noticeable difference in color intensity between different containers from the set of mass-produced containers is considered to be a difference of at least 20% color saturation of a visible white light after passing therethrough, and preferably 30%.

A 100% saturation corresponds to colors of maximum intensity, and as saturation is reduced, the color turns grayish and dull. The images on gray scale have a 0% saturation. For example, the color khaki is a green color with a low color saturation.

By combining noticeable differences in color with differences of at least 16 nm between them, and noticeable differences in color intensity with differences of at least 20% between them, many different colors can be achieved.

By way of example, there is proposed a list of chromatic variations with their own name, and they can be distinguished from one another as a result of the aforementioned noticeable differences:

chocolate, brown, chestnut, brick red, cherry, red, vermilion, coral, magenta, salmon, orange, ochre, yellow, lime green, grass green, olive green, algae green, emerald green, aquamarine green, turquoise, cyan, cerulean blue, blue, navy blue, indigo, purple, violet, lilac, amethyst, eggplant, mauve, lavender, fuchsia, pink, straw, gray.

Therefore, the present invention proposes, for example, two containers with an identical shape, content, and labeling but the glass of which has an olive green color in one case and a turquoise color in the other case.

The chromatic diversity in the containers with an identical shape, size, content, and labeling allows said set of mass-produced containers to be manufactured using heterogeneous clear recovered post-consumer glass with varied coloring, in a certain percentage greater than 80% or even greater than 90%.

According to one embodiment, the percentage of recycled post-consumer glass can be more than 95% or even reach 100%.

It is also proposed that at least two containers from the set of mass-produced containers include noticeable cosmetic defects in the glass that are different from one another.

Said noticeable cosmetic defects will preferably be selected from bubbles, scratches, corrugations, or roughness on the surface generating noticeable optical aberrations.

It will be understood that for an aesthetic flaw to be noticeable, it must have a certain size. For example, the bubbles must have a diameter of at least 2 mm, the scratches a length of at least 4 mm, and the corrugations or roughness on the surface will cause optical aberrations producing a deviation of at least 2 mm on a straight line observed through said container.

All this allows the percentage of rejection due to aesthetic manufacturing defects to be reduced, even to zero, reducing costs and the ecological impact caused by the manufacture.

The recovered post-consumer glass used for the manufacture of the set of containers object of the present invention may consist, by at least 90%, of pieces of clear recovered glass, i.e., with a transparency equal to or greater than 70%, and with a heterogeneous coloring, i.e., pieces of glass with different distinguishable colors will be mixed, for example, with different greenish, and/or bluish, and/or brownish colors. In other words, different pieces of glass from the mixture of pieces of glass traversed by a white light will offer a light with a different predominant wavelength.

It is also proposed that the mass-produced containers lack color additives in addition to those present in the recovered post-consumer glass, the color and shade of the mass-produced containers being the result of the mixture of the color and shade of the pieces of recovered glass used in their manufacture.

The invention claimed is:

1. A method of manufacturing a set of containers with an identical shape produced through an automatic blow molding process, the method comprising:

obtaining successive batches of raw material for glass manufacture, each batch comprising at least 80% by weight of post-consumer glass that is clear, wherein each batch has a heterogeneous chromatic composition that differs between successive batches;

successively melting each batch of raw material, resulting in successive batches of melted raw material with different chromatic compositions;

manufacturing successive batches of containers with a noticeably different color and/or color intensity with different visible light absorption pattern between the containers of the different batches, by manufacturing the successive batches of containers with the successive batches of melted raw material with different chromatic compositions; resulting in a set of containers with a heterogeneous chromatic composition;

detecting and rejecting only the containers exhibiting dimensional and/or safety manufacturing defects causing alterations in the shape and/or geometry of the container above predefined tolerances, while ignoring any variation in the chromatic composition of the containers;

filling all the containers from the set of non-rejected containers with identical product and labelling with an identical label;

wherein the post-consumer glass with the heterogeneous chromatic composition comprises a mixture of pieces of clear color-less glass in a first percentage and pieces of clear colored glass in a second percentage with the first percentage and the second percentage being variable between different batches of raw material.

2. The method according to claim 1, wherein the post-consumer glass with the heterogeneous chromatic composition constitutes at least 90% by weight of the batches of raw material.

3. The method according to claim 1, wherein each batch of raw material lack color additives other than those contained in the post-consumer glass with the heterogeneous chromatic composition.

4. The method according to claim 1, wherein the post-consumer glass with the heterogeneous chromatic composition comprises a mixture of pieces of opaque colored glass in a third percentage, with the first percentage, the second percentage, and the third percentage being variable between different batches of raw material, with maximum variations of at least 10% between different batches.

5. The method according to claim 4, wherein the clear color-less glass is one that lets more than 75% of the incident visible light pass therethrough, the clear colored glass is one that lets more than 75% of the incident visible light pass therethrough, and the opaque colored glass is one that lets equal to or less than 75% of the incident visible light pass therethrough.

6. The method according to claim 5, wherein the sum of the second percentage and of the third percentage represents at least 20% of the total weight of the post-consumer glass with the heterogeneous chromatic composition.

7. The method according to claim 5, wherein the pieces of clear colored glass comprise pieces of glass with different shades of green, with different shades of brown and optionally different shades of blue, in variable proportions in successive batches.

8. The method according to claim 1, wherein the raw material contains bubble precursor particles, and/or the temperature of the molten material and/or the temperature of a blow mold used in the blow molding process is selected to generate flaws visible to the naked eye in the manufactured containers.

* * * * *